United States Patent [19]
Chalasani et al.

[11] Patent Number: 6,160,379
[45] Date of Patent: Dec. 12, 2000

[54] MODE SELECTION CIRCUIT FOR A BATTERY, A METHOD OF SELECTING MODES FOR THE BATTERY AND A BATTERY BACK-UP POWER SUPPLY EMPLOYING THE CIRCUIT AND METHOD

[75] Inventors: Subhas Chandra Chalasani, Plano; Mark Elliot Jacobs, Dallas; Vijayan Joseph Thottuvelil, Plano, all of Tex.

[73] Assignee: Lucent Technologies Inc., Murray Hill, N.J.

[21] Appl. No.: 09/465,509

[22] Filed: Dec. 16, 1999

Related U.S. Application Data

[62] Division of application No. 08/950,642, Oct. 15, 1997, Pat. No. 6,037,747.

[51] Int. Cl.[7] ................................................. H01M 10/46
[52] U.S. Cl. ............................................ 320/119; 320/133
[58] Field of Search .................................... 320/127, 128, 320/130, 133, 119, 135, 140, 155

[56] References Cited

U.S. PATENT DOCUMENTS 5,289,102  2/1994  Toya .
5,565,757  10/1996  Ikeda et al. .

FOREIGN PATENT DOCUMENTS 0 473 514 A2  3/1992  European Pat. Off. .
0 532 232 A2  3/1993  European Pat. Off. .

*Primary Examiner*—Edward H. Tso

[57] ABSTRACT

For use with a reserve battery couplable to a charging circuit capable of providing a charging current to the reserve battery, a mode selection circuit and a method of operation thereof. The mode selection circuit includes, in one embodiment, (1) a signal generator that generates a signal based on a temperature of the reserve battery and (2) a mode-changing circuit, coupled to the signal generator, that accepts the signal and selects an alternative one of: (a) a non-charge mode in which the charging current is substantially interrupted when the temperature is greater than a reference temperature and (b) a charge mode in which the charging current is provided to the reserve battery when the temperature is less than the reference temperature.

23 Claims, 2 Drawing Sheets

MODE SELECTION CIRCUIT FOR A BATTERY, A METHOD OF SELECTING MODES FOR THE BATTERY AND A BATTERY BACK-UP POWER SUPPLY EMPLOYING THE CIRCUIT AND METHOD

This Application is a Divisional of prior application Ser. No. 08/950,642, filed on Oct. 15, 1997, now U.S. Pat. No. 6,037,747. The above-listed Application is commonly assigned with the present invention and is incorporated herein by reference as if reproduced herein in its entirety.

TECHNICAL FIELD OF THE INVENTION

The present invention is directed, in general, to power supplies and, more specifically, to a mode selection circuit for a battery and a method of operation thereof.

BACKGROUND OF THE INVENTION

In a variety of telecommunications and other applications, batteries [e.g., valve-regulated lead acid (VRLA) batteries] are employed to provide reserve energy to the equipment powered thereby. With the increasing trend toward distributed power systems, battery reserve systems are often located in outdoor uncontrolled environments. Over a decade of experience in using VRLA batteries in outdoor environments has clearly shown that high temperatures drastically reduce the life of the battery. The lifetime of a typical VRLA battery with a rated life of ten years at a constant operating ambient temperature of 25° C. will be reduced by a factor of two for approximately every 7° C. rise in average operating temperature. When deployed in outdoor environments, the batteries are generally placed in closed cabinets with poor heat-exchange characteristics. The batteries are, therefore, exposed to high temperatures with poor ventilation. As a result, a ten-year rated battery may have its lifetime reduced to a quarter or a third of its rated value, especially in warmer climates such as Dallas, Texas.

While reducing the temperature of the operating environment of the battery is an important factor in sustaining the life of the battery, there are other ancillary considerations as well. The system employed to maintain the battery in a state of readiness (i.e., fully charged) is another important consideration in battery reserve systems. A known technique to improve the life of a battery is to employ an intermittent charging system. An intermittent charging system is disclosed in *A New Concept: Intermittent Charging of Lead Acid Batteries in Telecommunication Systems,* by D. P. Reid, et al. (Reid), Proceedings of INTELEC 1984, pp. 67–71, which is incorporated herein by reference.

Since the commercial AC power source is typically available about 99.9% of the time, the battery is conventionally maintained in a float mode whereby the battery is fully charged and is essentially being topped-off continuously. With an intermittent charging system, the battery is only charged a fraction of the time and, otherwise, the battery is disconnected from the charging circuit. Such a system is very sensible with VRLA batteries especially in view of the fact that VRLA batteries suffer from relatively low self-discharge rates (e.g., less than 10% over a 180 day period at about 25° C.). Analogous to the loss of battery capacity at higher temperatures, it is estimated that the self-discharge rate approximately doubles for every 10° C. rise in temperature. Even with the increase in self-discharge rates associated with higher operating temperatures, a relatively low duty cycle (i.e., ratio of the charging time to total time) is sufficient to maintain the battery in a state of readiness should the commercial power source be interrupted.

Since elements of the battery experience aging during float charging (e.g., excess current contributes to grid corrosion of the positive plate of the battery and water loss), it would be advantageous to decrease the period of time that the battery is in the float mode. As disclosed in Reid, the life of a battery may double by employing a 50% float duty cycle over a full float duty cycle operation for a particular battery design. Therefore, a reduction in the float mode duty cycle significantly increases the life of the battery.

As previously mentioned, Reid discloses a system that intermittently charges the battery. Reid fails to recognize, however, that float charging contributes to excess current charging of the battery (in excess of the charge necessary to compensate for the charge being replenished or lost during self-discharge) thereby unnecessarily heating the battery. The reactions that diminish battery life during float charging are accelerated at higher temperatures thereby further contributing to the degradation of the life of the battery.

Accordingly, what is needed in the art is a recognition that charging a battery under particular environmental conditions affects the life of the battery and, more particularly, what is needed is an intermittent system for charging a battery that overcomes the deficiencies in the prior art.

SUMMARY OF THE INVENTION

To address the above-discussed deficiencies of the prior art, the present invention provides for use with a reserve battery couplable to a charging circuit capable of providing a charging current to the reserve battery, a mode selection circuit and a method of operation thereof.

The mode selection circuit includes, in one embodiment, (1) a signal generator that generates a signal based on a temperature of the reserve battery and (2) a mode-changing circuit, coupled to the signal generator, that accepts the signal and selects an alternative one of: (a) a non-charge mode in which the charging current is substantially interrupted when the temperature is greater than a reference temperature and (b) a charge mode in which the charging current is provided to the reserve battery when the temperature is less than the reference temperature.

The present invention, therefore, recognizes that float charging a battery at higher ambient temperature conditions has deleterious effects on the life of the battery. By charging the battery, in one embodiment, during the periods of time when the ambient temperatures are lower and providing substantially zero charging current to the battery otherwise, additional improvements in extending battery life are possible. Consequently, the mode selection circuit alternatively selects a mutually-exclusive one of the non-charge or charge mode for a battery reserve system. The intermittent charging system provides an effective technique for protecting and extending the life of the reserve battery.

The foregoing has outlined, rather broadly, a preferred and alternative feature of the present invention so that those skilled in the art may better understand the detailed description of the invention that follows. Additional features of the invention will be described hereinafter that form the subject of the claims of the invention. Those skilled in the art appreciate that they can readily use the disclosed conception and specific embodiment as a basis for designing or modifying other structures for carrying out the same purposes of the present invention. Those skilled in the art also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
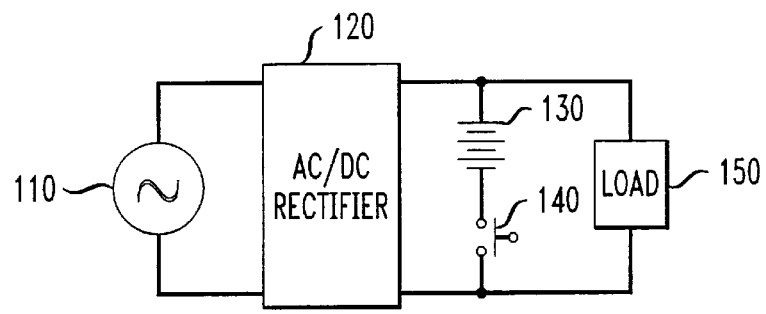
FIG. 1 illustrates a schematic diagram of a battery back-up power supply providing an environment for the present invention.

Referring initially to FIG. 1, illustrated is a schematic diagram of a battery back-up power supply 100 providing an environment for the present invention. The power supply 100 includes a source of electrical power 110 coupled to an AC/DC rectifier 120. The AC/DC rectifier 120 is then couplable to a reserve battery 130 and is adapted to float charge the reserve battery 130. The power supply also includes a disconnect switch 140 coupled to the reserve battery 130. When the reserve battery 130 is almost completely discharged following the loss of AC power, the disconnect switch 140 decouples the reserve battery 130 from a load 150 to avoid putting the reserve battery 130 into a deep discharge. The power supply 100 provides power to the load 150.

Figure 2:
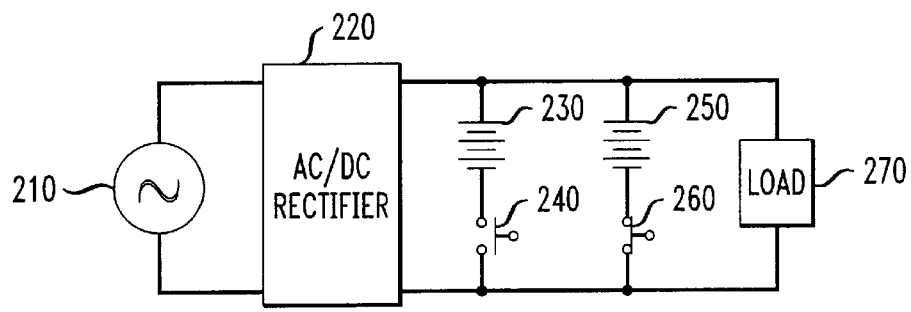
FIG. 2 illustrates a schematic diagram of another battery back-up power supply providing an environment for the present invention.

Turning now to FIG. 2, illustrated is a schematic diagram of another battery back-up power supply 200 providing an environment for the present invention. The power supply 200 includes a source of electrical power 210 coupled to an AC/DC rectifier 220. The AC/DC rectifier 220 is then couplable to a first reserve battery 230 and a second reserve battery 250 and is adapted to float charge both batteries. The power supply 200 also includes a first disconnect switch 240 coupled to the first reserve battery 230 and a second disconnect switch 260 coupled to the second reserve battery 250. The disconnect switches 240, 260 connect and disconnect the batteries in an alternating fashion such that at least one of the batteries is connected at all times. The power supply 200 provides power to a load 270.

Power supplies employing multiple battery strings are often employed in wireless applications at lower voltages (e.g., 24 to 48 volts). Obviously, the reserve batteries 230, 250 are limited to charging at a duty cycle of 50% or more. Thus, with n battery strings, the minimum duty cycle is 1/n. The power supply 200, therefore, would benefit from an intermittent charging system as disclosed herein.

Figure 3:
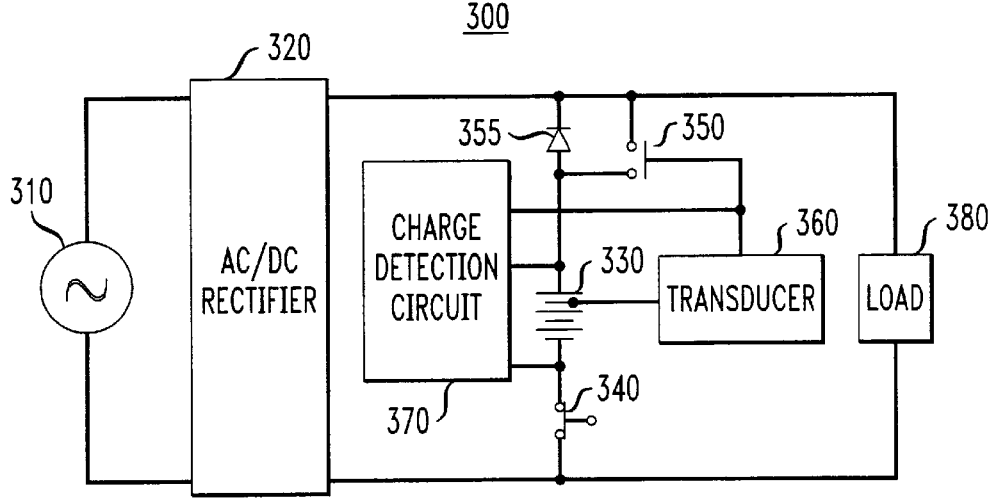
FIG. 3 illustrates a schematic diagram of a battery back-up power supply incorporating an embodiment of a mode selection circuit constructed according to the principles of the present invention.

Turning now to FIG. 3, illustrated is a schematic diagram of a battery back-up power supply 300 incorporating an embodiment of a mode selection circuit constructed according to the principles of the present invention. The power supply 300 includes a source of electrical power 310 coupled to an AC/DC rectifier 320 (a charging circuit in the illustrated embodiment). The AC/DC rectifier 320 is coupled to the mode selection circuit that includes a mode-changing circuit, for instance, a temperature-dependant mode-changing circuit, [a parallel coupled switch (e.g., a low-voltage drop metallic contactor 350 and diode 355) and a signal generator, in this embodiment a temperature transducer 360 (e.g., a thermistor and associated amplifier circuit that generates a voltage proportional to the temperature of the reserve battery 330), which is in turn couplable to a reserve battery 330. The power supply 300 may also include a disconnect switch 340 coupled to the reserve battery 330. When the reserve battery 330 is almost completely discharged following the loss of AC power, the disconnect switch 340 decouples the reserve battery 330 from a load 380 to avoid putting the reserve battery 330 into a deep discharge. The power supply 300 additionally provides power to the load 380.

The temperature transducer 360 is coupled between the reserve battery 330 and the mode-changing circuit. The transducer 360 relays a signal to a control terminal of the switch 350 based upon or indicative of the temperature of the reserve battery 330. When the sensed temperature of the reserve battery 330 drops below a reference temperature, the transducer 360 signals the switch 350 to close and the reserve battery 330 is charged. Furthermore, a charge detection circuit 370 (e.g., a voltage detection circuit that measures the open circuit voltage across the reserve battery 330) may be coupled in parallel with the reserve battery 330 and a control signal is coupled from the charge detection circuit 370 to the switch 350. When the battery voltage drops below a predetermined level and the sensed temperature is below the reference temperature, the switch 350 is closed and the reserve battery 330 is charged. Conversely, if the battery voltage is above the predetermined level, the switch 350 is opened and a charging current to the reserve battery 330 is substantially interrupted thereby facilitating a non-charging mode of operation.

When the source of electrical power 310 is available and the reserve battery 330 is not being charged, the switch 350 is opened and the output voltage of the AC/DC rectifier 320 is adjusted above the open-circuit voltage of the reserve battery 330 such that the diode 355 is reverse biased and no current flows into the reserve battery 330. The reserve battery 330 experiences a small self-discharge, but since no current is flowing therethrough, no energy from an external source dissipates as heat in the reserve battery 330 thereby extending the life of the reserve battery 330.

In the event of a failure of the source of electrical power 310, the output voltage of the AC/DC rectifier 320 drops to a point where the diode 355 begins conducting and the reserve battery 330 then immediately powers the load 380. The switch 350 closes soon after the diode 355 begins conducting such that the reserve battery 330 can deliver the power to the load 380. Of course, the switch 350 and diode 355 may include any type of switching device and still be within the broad scope of the present invention.

Again, to charge the reserve battery 330 when the source of electrical power 310 is available and the temperature is in the proper region, the switch 350 is closed and the voltage of the AC/DC rectifier 320 is adjusted to float-charge the reserve battery 330. To stop charging the reserve battery 330, the switch 350 is opened and the voltage of the AC/DC rectifier 320 is maintained above the open-circuit voltage of the reserve battery 330 such that the diode 355 is in a nonconducting state. In this manner, the reserve battery 330 can be intermittently charged (even with only a single battery string) without limiting the immediate availability of the reserve battery 330 to power the load 380. The intermittent charging system can, therefore, provide any charging duty cycle even with multiple battery strings in parallel.

Figure 4:
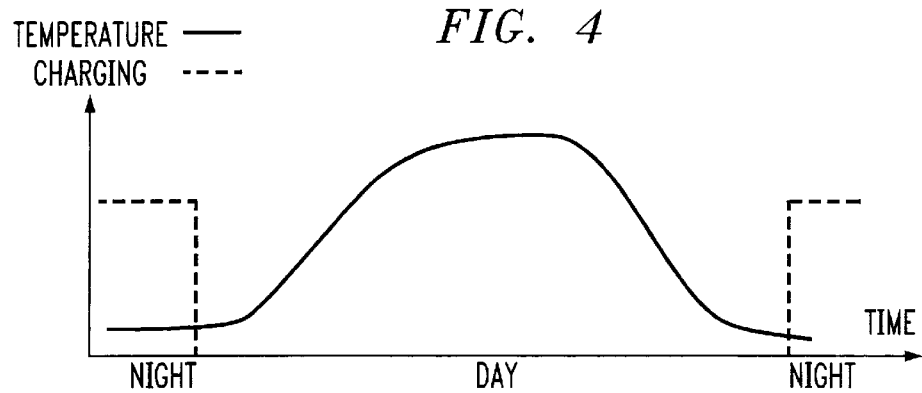
FIG. 4 illustrates a diagram of a temperature verses time profile for an exemplary reserve battery in a typical outdoor application.

Turning now to FIG. 4, illustrated is a diagram of a temperature verses time profile for an exemplary reserve battery in a typical outdoor application. As time cycles from night to day to night, the reserve battery will be charged during the time when the transducer senses a temperature below a reference level. In one embodiment, when the battery temperature is above the reference level, the reserve battery will not be charged. As illustrated in the profile, one methodology to implement battery charging is to charge the battery during the night when the temperature of the battery plant is lower. While many alternative schemes are available, it is advantageous to charge the battery when the environmental temperature is below a reference temperature (e.g., 30° C.) to, ultimately, extend the life of the battery. Those skilled in the art understand that any type of battery such as a valve-regulated lead acid (VRLA) battery is well within the broad scope of the present invention. Those skilled in the art also understand that the reference temperature includes any temperature (depending on, for instance, the climate of the installation) and the temperature may be periodically or continually modified (depending on, for instance, the working conditions of the installation) and still be within the broad scope of the present invention.

Figure 5:
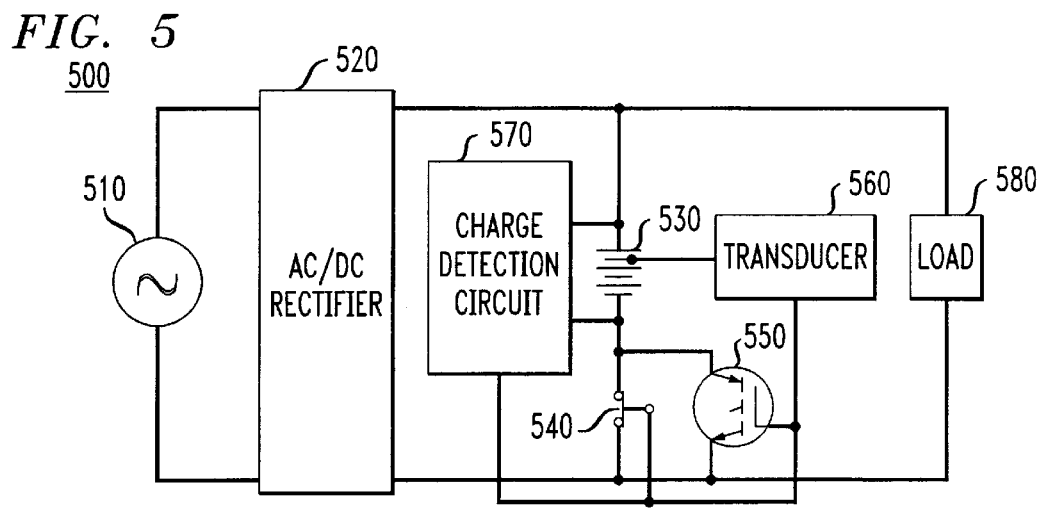
FIG. 5 illustrates a schematic diagram of a battery back-up power supply incorporating another embodiment of a mode selection circuit constructed according to the principles of the present invention.

Turning now to FIG. 5, illustrated is a schematic diagram of a battery back-up power supply 500 incorporating another embodiment of a mode selection circuit constructed according to the principles of the present invention. The power supply 500 includes a source of electrical power 510 coupled to an AC/DC rectifier 520. The AC/DC rectifier 520 is then coupled to the mode selection circuit that includes a mode-changing circuit (a low voltage disconnect circuit including a controlled switching device 550, e.g., an isolated-gate bipolar transistor, and a disconnect switch 540) and a signal generator (e.g., a temperature transducer 560), which is in turn couplable to a reserve battery 530. When the reserve battery 530 is almost completely discharged following the loss of AC power, the disconnect switch 540 decouples the reserve battery 530 from a load 580 to avoid putting the reserve battery 530 into a deep discharge. Additionally, the power supply 500 provides power to the load 580.

The temperature transducer 560 is coupled between the reserve battery 530 and the low voltage disconnect circuit. The transducer 560 relays a control signal to the disconnect switch 540 based upon or indicative of the temperature of the reserve battery 530. When the sensed temperature of the reserve battery 530 drops below a reference temperature, the transducer 560, sensing the drop, signals the disconnect switch 540 to close and the reserve battery 530 is charged. Furthermore, a charge detection circuit 570 is coupled in parallel with the reserve battery 530 and a control signal is coupled from the charge detection circuit 570 to the low voltage disconnect circuit. When the voltage of the reserve battery 530 drops below a predetermined level and the sensed temperature is below the reference temperature, the disconnect switch 540 is closed and the reserve battery 530 is charged. Conversely, if the battery voltage is above the predetermined level, the disconnect switch 540 is opened and a charging current to the reserve battery 530 is substantially interrupted thereby facilitating a non-charging mode of operation.

When the reserve battery 530 is not being charged, the disconnect switch 540 and the controlled switching device 550 are both open. In the event of a loss of AC power, the disconnect switch 540 and the controlled switching device 550 are both transitioned on. The controlled switching device 550 transitions on rapidly (within a few microseconds) ensuring that the power to the load 580 is not disrupted. The disconnect switch 540 turns on a few milliseconds later and due to its lower on-state drop reduces the dissipation in the controlled switching device 550 to near zero. Thereafter, the controlled switching device 550 may be turned off. Since the controlled switching device 550 carries current for only a few milliseconds, the energy dissipation therethrough is relatively small. If the voltage of the reserve battery 530 falls below a predetermined threshold, the disconnect switch 540 may be opened to disconnect the reserve battery 540 from the load 580. Of course, any controllable switching device may be employed in lieu of the switching devices illustrated and described above.

Figure 6:
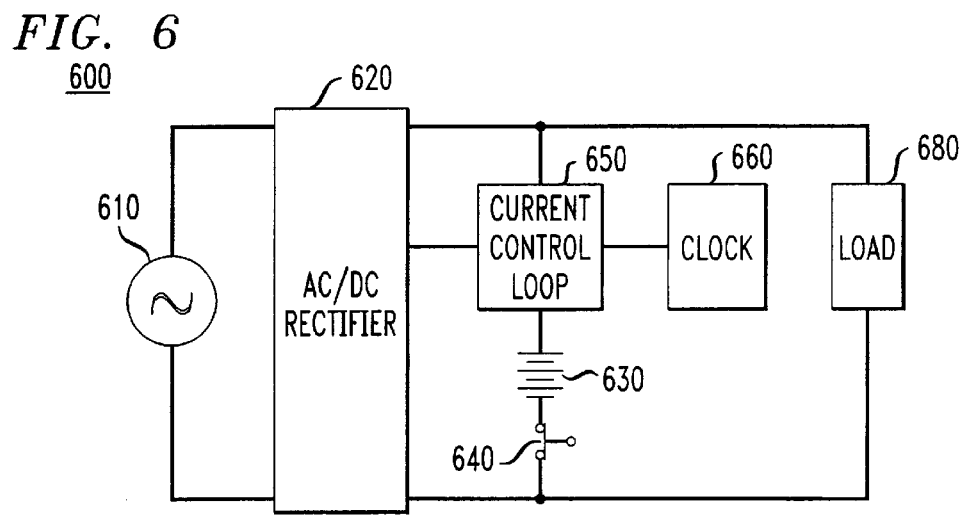
FIG. 6 illustrates a schematic diagram of a battery back-up power supply incorporating another embodiment of a mode selection circuit constructed according to the principles of the present invention.

Turning now to FIG. 6, illustrated is a schematic diagram of a battery back-up power supply 600 incorporating another embodiment of a mode selection circuit constructed according to the principles of the present invention. The power supply 600 includes a source of electrical power 610 coupled to an AC/DC rectifier 620. The AC/DC rectifier 620 is then coupled to a reserve battery 630. The power supply 600 also includes a disconnect switch 640 coupled to the reserve battery 630. Additionally, the power supply 600 provides power to a load 680.

The illustrated embodiment employs a combination of charging current and non-charging current to provide intermittent charging. By monitoring the current of the reserve battery 630 and using a current control loop 650, the charging of the reserve battery 630 occurs as follows. The reserve battery 630 is float charged by regulating the float voltage. When the charging of the reserve battery 630 is to be terminated, the output voltage of the AC/DC rectifier 620 is adjusted by the current control loop 650 to a value near the open-circuit voltage of the reserve battery 630 thereby controlling the current therethrough within a small value.

More specifically, a clock 660 (or any timing device) is coupled to the current control loop 650 (forming part of the mode selection circuit). The clock 660 relays a signal to the current control loop 650, that may be based upon or indicative of a temperature of the reserve battery 630. At a predetermined time period, a current sufficient to charge the reserve battery (a charging current) is provided to the reserve battery 630 during a charge mode. At a time period other than the predetermined time period, the charging current is substantially interrupted to the reserve battery 630 during a non-charge mode. In the event of a loss of the source of electrical power 610, the reserve battery 630 is already connected to the load so no additional steps are necessary. This particular embodiment does not require any additional connections except monitoring the current into the reserve battery 630 and the control of the charging current or voltage. Of course, other techniques to control the current through the reserve battery 630 are well within the broad scope of the present invention.

The above noted descriptions include possible embodiments of the present invention. Other possible variations include, without limitation:

Monitoring battery temperature and estimating the self discharge rates when the battery is not being charged, and when the estimated total self-discharge of the battery has dipped below a threshold, charge the battery to replenish the charge;

Varying the charging time and monitoring the charging current to replenish the charge estimated to have been lost due to self discharge (with some excess charging to account for errors in estimating the self discharge), so as to further minimize overcharging; and When the battery is "not being charged", maintain the battery voltage at a value (probably temperature dependent) that maximizes the life of the battery.

Thus, in the alternative embodiment of the present invention, the intermittent charging system is related to a time of day or period of time. In conjunction with historical weather trends, for instance, the battery may be charged during specific times of the day when the temperature is at its coolest. For instance, the battery may be automatically charged from 2:00 to 4:00 AM everyday or periodically, depending on the expected discharge rate of the battery. Those skilled in the art understand that various techniques to intermittently charge the battery in connection with predetermined time periods are available and are well within the broad scope of the present invention.

Although the present invention has been described in detail, those skilled in the art understand that they can make various changes, substitutions and alterations herein without departing from the spirit and scope of the invention in its broadest form.

What is claimed is:

1. For use with a reserve battery couplable to a charging circuit capable of providing a charging current to said reserve battery, a mode selection circuit, comprising:

a signal generator that generates a signal based on a time of day; and a mode-changing circuit, coupled to said signal generator, that accepts said signal and selects an alternative one of:
 a charge mode in which said charging current is provided to said reserve battery during a predetermined time of day, and
 a non-charge mode in which said charging current is substantially interrupted during time periods other than said predetermined time of day.

2. The circuit as recited in claim 1 further comprising a charge detection circuit, coupled to said reserve battery, that monitors a charge of said reserve battery, said mode-changing circuit further selecting an alternative one of:
 said charge mode in which said charging current is provided to said reserve battery during said predetermined time period and when said charge is below said predetermined value, and
 said non-charge mode in which said charging current is substantially interrupted when said charge is above a predetermined value.

3. The circuit as recited in claim 1 wherein said charging circuit comprises an AC/DC rectifier.

4. The circuit as recited in claim 1 wherein said reserve battery is a valve-regulated lead acid (VRLA) battery.

5. The circuit as recited in claim 1 wherein said mode-changing circuit comprises a parallel-coupled switch and diode coupled to said reserve battery.

6. The circuit as recited in claim 1 wherein said mode-changing circuit comprises a low-voltage-disconnect (LVD) circuit coupled to said reserve battery.

7. The circuit as recited in claim 1 wherein said mode-changing circuit comprises a current control loop.

8. The circuit as recited in claim 1 wherein said signal generator comprises a clock.

9. For use with a reserve battery couplable to a charging circuit capable of providing a charging current to said reserve battery, a method of selecting modes for said reserve battery, comprising:

providing a signal based on a time of day with a signal generator; and accepting said signal with a mode-changing circuit, coupled to said signal generator, and selecting an alternative one of:
 a charge mode in which said charging current is provided to said reserve battery during a predetermined time of day, and
 a non-charge mode in which said charging current is substantially interrupted during time periods other than said predetermined time of day.

10. The method as recited in claim 9 further comprising monitoring a charge of said reserve battery with a charge detection circuit, coupled to said reserve battery, that method further selecting an alternative one of:
 said charge mode in which said charging current is provided to said reserve battery during said predetermined time period and when said charge is below said predetermined value, and
 said non-charge mode in which said charging current is substantially interrupted when said charge is above a predetermined value.

11. The method as recited in claim 9 wherein said charging circuit comprises an AC/DC rectifier.

12. The method as recited in claim 9 wherein said reserve battery is a valve-regulated lead acid (VRLA) battery.

13. The method as recited in claim 9 wherein said mode-changing circuit comprises a parallel-coupled switch and diode coupled to said reserve battery.

14. The method as recited in claim 9 wherein said mode-changing circuit comprises a low-voltage-disconnect (LVD) circuit coupled to said reserve battery.

15. The method as recited in claim 9 wherein said mode-changing circuit comprises a current control loop.

16. The method as recited in claim 9 wherein said signal generator comprises a clock.

17. A battery back-up power supply, comprising:

a source of electrical power;

an AC/DC rectifier coupled to said source of electrical power;

a reserve battery couplable to a said AC/DC rectifier, said AC/DC rectifier capable of charging said reserve battery; and a mode selection circuit, including:
 a signal generator that generates a signal based on a time of day, and
 a mode-changing circuit, coupled to said signal generator, that accepts said signal and selects an alternative one of:
  a charge mode in which said charging current is provided to said reserve battery during a predetermined time of day, and
  a non-charge mode in which said charging current is substantially interrupted during time periods other than said predetermined time of day.

18. The power supply as recited in claim 17 further comprising a charge detection circuit, coupled to said reserve battery, that monitors a charge of said reserve battery, said mode-changing circuit further selecting an alternative one of:
 said charge mode in which said charging current is provided to said reserve battery during said predetermined time period and when said charge is below said predetermined value, and said non-charge mode in which said charging current is substantially interrupted when said charge is above a predetermined value.

19. The power supply as recited in claim 17 wherein said reserve battery is a valve-regulated lead acid (VRLA) battery.

20. The power supply as recited in claim 17 wherein said mode-changing circuit comprises a parallel-coupled switch and diode coupled to said reserve battery.

21. The power supply as recited in claim 17 wherein said mode-changing circuit comprises a low-voltage-disconnect (LVD) circuit coupled to said reserve battery.

22. The power supply as recited in claim 17 wherein said mode-changing circuit comprises a current control loop.

23. The power supply as recited in claim 17 wherein said signal generator comprises a clock.

\* \* \* \* \*